(12) United States Patent
Dulle et al.

(10) Patent No.: US 11,037,748 B2
(45) Date of Patent: Jun. 15, 2021

(54) INTEGRATED CONNECTOR HAVING SENSE AND SWITCHING CONDUCTORS FOR A RELAY USED IN A BATTERY MODULE

(71) Applicant: JOHNSON CONTROLS TECHNOLOGY COMPANY, Auburn Hills, MI (US)

(72) Inventors: Ronald J. Dulle, Mequon, WI (US); Anthony E. Farrell, Holland, MI (US); Richard M. DeKeuster, Racine, WI (US)

(73) Assignee: CPS Technology Holdings LLC, New York, NY (US)

( * ) Notice: Subject to any disclaimer, the term of this patent is extended or adjusted under 35 U.S.C. 154(b) by 0 days.

(21) Appl. No.: 15/913,436

(22) Filed: Mar. 6, 2018

(65) Prior Publication Data

US 2018/0197706 A1    Jul. 12, 2018

Related U.S. Application Data

(62) Division of application No. 14/502,732, filed on Sep. 30, 2014, now Pat. No. 9,947,497.

(51) Int. Cl.
| | |
|---|---|
| *H01H 47/32* | (2006.01) |
| *B60L 58/19* | (2019.01) |
| *B60L 50/60* | (2019.01) |
| *B60L 50/64* | (2019.01) |
| *H01M 10/42* | (2006.01) |

(52) U.S. Cl.
CPC .......... *H01H 47/325* (2013.01); *B60L 50/64* (2019.02); *B60L 50/66* (2019.02); *B60L 58/19* (2019.02); *H01M 10/4207* (2013.01); *Y02T 10/70* (2013.01)

(58) Field of Classification Search
CPC ....... H01H 47/325; B60L 50/64; B60L 50/66; B60L 58/19; H01M 10/4207
USPC .................................................. 307/130, 10.1
See application file for complete search history.

(56) References Cited

U.S. PATENT DOCUMENTS

| | | | |
|---|---|---|---|
| 4,870,296 A * | 9/1989 | Nordeborn ........... | B60Q 1/1407 |
| | | | 307/10.8 |
| 4,883,728 A | 11/1989 | Witehira | |
| 5,175,484 A | 12/1992 | Witehira | |
| 6,020,718 A | 2/2000 | Ozawa et al. | |

(Continued)

OTHER PUBLICATIONS

PCT/US2015/047104 International Search Report and Written Opinion dated Nov. 24, 2015.

(Continued)

*Primary Examiner* — Michael R. Fin
(74) *Attorney, Agent, or Firm* — Boardman & Clark LLP

(57) ABSTRACT

Relays having internal connections on both sides of their switches may be used in conjunction with a connector that integrates both the normal relay switch control lines with the sensing conductors of a control module for a battery module of an energy storage device. In this manner, sensing conductors may be routed along with the switch control lines for the relay instead of separately as described above. This integration reduces the complexity and cost associated with the energy storage device, because it reduces the number of separately routed lines and also eliminates the external connections for at least some of the sensing conductors.

7 Claims, 4 Drawing Sheets

(56) References Cited

U.S. PATENT DOCUMENTS

| | | | |
|---|---|---|---|
| 6,121,750 A * | 9/2000 | Hwa | H01M 10/0445 |
| | | | 307/10.1 |
| 6,259,978 B1 * | 7/2001 | Feely | B61L 19/06 |
| | | | 246/167 R |
| 6,573,621 B2 | 6/2003 | Neumann | |
| 6,657,833 B2 | 12/2003 | Matsuki | |
| 7,176,654 B2 | 2/2007 | Meyer et al. | |
| 7,433,182 B2 | 10/2008 | Fan | |
| 7,446,433 B2 | 11/2008 | Masciarelli et al. | |
| 7,615,885 B2 * | 11/2009 | Puschkat | H01H 50/047 |
| | | | 307/10.1 |
| 7,635,983 B2 | 12/2009 | Pecile | |
| 7,679,325 B2 | 3/2010 | Seo | |
| 7,709,977 B2 | 5/2010 | Jansen et al. | |
| 7,746,031 B2 | 6/2010 | Ishishita | |
| 7,880,432 B2 | 2/2011 | Watanabe et al. | |
| 8,129,952 B2 | 3/2012 | Lee | |
| 8,307,222 B2 | 11/2012 | Wang et al. | |
| 8,467,159 B2 | 6/2013 | Jung et al. | |
| 8,536,826 B2 | 9/2013 | Matsuoka et al. | |
| 8,541,978 B2 * | 9/2013 | Fukuo | B60L 3/0069 |
| | | | 320/109 |
| 8,629,581 B2 | 1/2014 | Rutkowski et al. | |
| 8,802,259 B2 | 8/2014 | Lee et al. | |
| 9,865,863 B2 | 1/2018 | Jang et al. | |
| 2002/0195996 A1 * | 12/2002 | Nakatsuji | H01M 10/4257 |
| | | | 320/127 |
| 2004/0053083 A1 | 3/2004 | Kobayashi et al. | |
| 2007/0014055 A1 | 1/2007 | Ness | |
| 2011/0001352 A1 | 1/2011 | Tamura | |
| 2011/0155485 A1 | 6/2011 | Tsurumi et al. | |
| 2011/0196545 A1 | 8/2011 | Miwa | |
| 2011/0210746 A1 | 9/2011 | Yugou et al. | |
| 2012/0235473 A1 | 9/2012 | Jiang et al. | |
| 2012/0244404 A1 | 9/2012 | Obasih | |
| 2013/0033101 A1 * | 2/2013 | Kaltenbrunner | B60R 16/03 |
| | | | 307/9.1 |
| 2014/0062493 A1 | 3/2014 | Farrell | |
| 2014/0356656 A1 | 12/2014 | Chen et al. | |
| 2015/0028877 A1 | 1/2015 | McCormick | |
| 2016/0156258 A1 | 6/2016 | Yokoyama | |

OTHER PUBLICATIONS

CN 201580056666.1 Office Action dated Dec. 5, 2018.
EP 15771311.6 Article 94(3) Communication dated Nov. 14, 2018.

* cited by examiner

INTEGRATED CONNECTOR HAVING SENSE AND SWITCHING CONDUCTORS FOR A RELAY USED IN A BATTERY MODULE

CROSS-REFERENCE TO RELATED APPLICATIONS

This application is a divisional of U.S. patent application Ser. No. 14/502,732 filed on Sep. 30, 2014, now U.S. Pat. No. 9,947,497, which is incorporated by reference herein in its entirety for all purposes.

BACKGROUND

The present disclosure generally relates to the field of batteries and battery modules. More specifically, the present disclosure relates to relay and connection architectures within battery modules that may be used in vehicular contexts, as well as other energy storage/expending applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 volt or 130 volt systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For instance, it may be beneficial to quantify the electrical performance of a battery module by measuring the voltage produced by the battery module. The measured voltage, for example, can be used to monitor the operation of the battery module. To accomplish this, the battery module may include measurement circuitry as well as voltage sensing lines disposed in the module, which can introduce manufacturing complexity and accordingly increase costs.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

It is often beneficial to quantify the electrical performance of a battery module by measuring the voltage produced by the battery module. The measured voltage, for example, can be used to monitor and control the operation of the battery module or its associated components. For instance, a battery control module may monitor the voltage to determine whether the battery module is capable of supplying a sufficient amount of power to various components (e.g., various loads internal or external to the battery module). To measure the voltage produced by the battery module, measurement electronics, such as voltage sensors, may be electrically connected to one or more connection points within the battery module. However, the connections between the measurement electronics and the connection points may be routed around other components within the battery module, which may increase the complexity of manufacturing and assembling the connections. Further, devices and methods such as ring terminals, fasteners, and welding, which may be used to create the connections between the measurement electronics and the connection points, may also increase the complexity and cost of assembling the connections.

For example, an energy storage device may include multiple battery modules. One or more relays may be used to selectively couple or decouple one or more of the respective battery modules from a system bus. Since each relay is typically positioned between each respective battery module and the bus, sensing conductors are typically coupled to the external connections of each relay to monitor the voltage of the battery modules and system bus, respectively. Again, the connections of these sensing conductors to these external relay connections and the routing of these sensing conductors back to the measurement circuitry create additional complexity and cost for the energy storage device.

To address these concerns, relays having internal connections on both sides of their switches may be used in conjunction with a connector that integrates both the normal relay switch control lines with the sensing conductors. In this manner, sensing conductors may be routed along with the switch control lines for the relay instead of separately as described above. This integration reduces the complexity and cost associated with the energy storage device, because it reduces the number of separately routed lines and also eliminates the external connections for at least some of the sensing conductors. Further, the internal connections and the sensing conductors may also be used to provide power to electronic devices within the battery module. The integration may eliminate the power connections for the electronic devices, and may increase the reliability and redundancy of the power source for the electronic devices.

DRAWINGS

Various aspects of this disclosure may be better understood upon reading the following detailed description and upon reference to the drawings in which.

Figure 6:
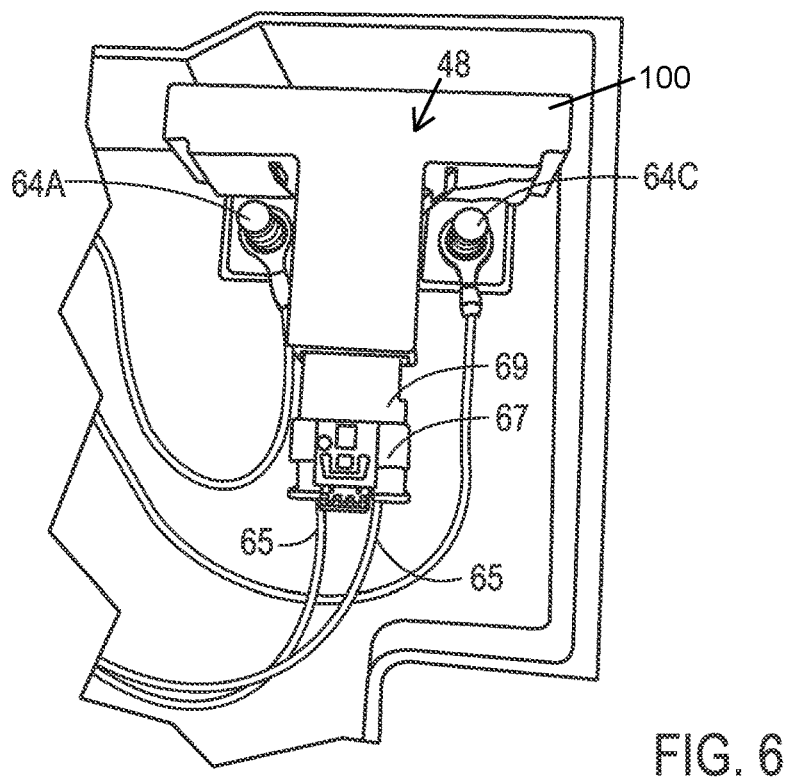
Figure 7:
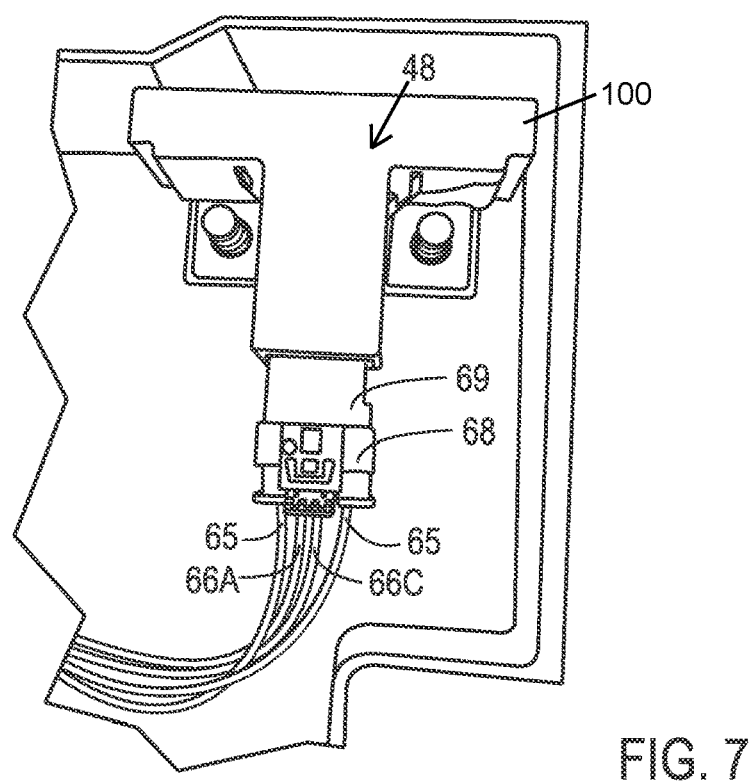

FIG. 6 is a diagrammatic view of a connector having only switch control lines plugged into a relay, where sensing lines are coupled to the external terminals of the relay; and FIG. 7 is a diagrammatic view of a connector that integrates switch control lines and voltage sensing lines, where the relay includes internal conductors that connect the voltage sensing lines to internal terminals of the relay.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, where each battery module may have a housing and a number of battery cells (e.g., lithium ion (Li-ion) electrochemical cells) arranged within the housing to provide particular voltages and/or currents useful to power, for example, one or more components of an xEV. As another example, battery modules in accordance with present embodiments may be incorporated with or provide power to stationary power systems (e.g., non-automotive systems).

As mentioned above, it is generally desirable to measure the voltage produced by the battery module for control purposes. The measured voltage, for example, can be used to monitor and control the operation of the battery module or its associated components. For example, a battery control module may monitor the voltage to determine whether the battery module is capable of supplying the a sufficient amount of power to various components (e.g., various loads internal or external to the battery module). The battery control module may also determine when the battery module is near the end of its lifetime, based at least on the voltage produced by the battery module over time, and may notify the user accordingly. To measure the voltage produced by the battery module, measurement electronics, such as voltage sensors, may be electrically connected to one or more connection points within the battery module. Unfortunately, as noted above, such measurement electronics and sensors are often associated with conductors, e.g., sensing lines or conductors, used for measurement and communication, and the routing and connection of these conductors can introduce complexity and cost associated with the battery module.

To address this issue, in the embodiments of battery modules described herein that include a relay, such as one that may be used to selectively couple or decouple the battery module from a system bus, the measurement electronics may be connected to one or more connection points located internal to the relay using a connector that integrates the switch control lines of the relay and the sensing conductors. Thus, the connections between the measurement electronics and the one or more connection points on a relay may be routed in a manner similar to the connections between the switch control lines and the relay, and the external connections of the sensing conductors can be eliminated. This may reduce the complexity of manufacturing and assembling the battery module, as the connections between the measurement electronics and the connection points on the relay do not have to be routed around other components and may be made without the use of additional devices (e.g., ring terminals and fasteners) or methods of securing such connections (e.g., welding).

The connection points may also be used to provide power to one or more electronic devices (e.g., a control module) in the battery module. That is, the connection points may be used to provide power to the electronic devices without utilizing a separate connection between the electronic devices and the associated power source. For instance, in the embodiments described below, battery cells within the battery module may apply power to the electronic devices via two connection points, one of which is located within the relay. Similarly, another battery module may also provide power to the electronic devices via two connection points, one of which is located within the relay. In other words, power provided to the electronic devices may be routed through the relay and the connector, as well as through other sensing points in the battery module, thereby simplifying wiring and connection schemes. As one example, the relay may include sense connection points that are used both as a sensing point and a source of power for the electronics internal to the battery module without having a separate connection. In such embodiments, the battery control module may be configured to select the appropriate power source based on various factors, such as the state of charge of the power sources, the temperature of the power sources, and so on. These power supply configuration may simplify the wiring scheme of the battery module and may also increase the reliability and redundancy of the power source for the electronic devices.

Figure 1:
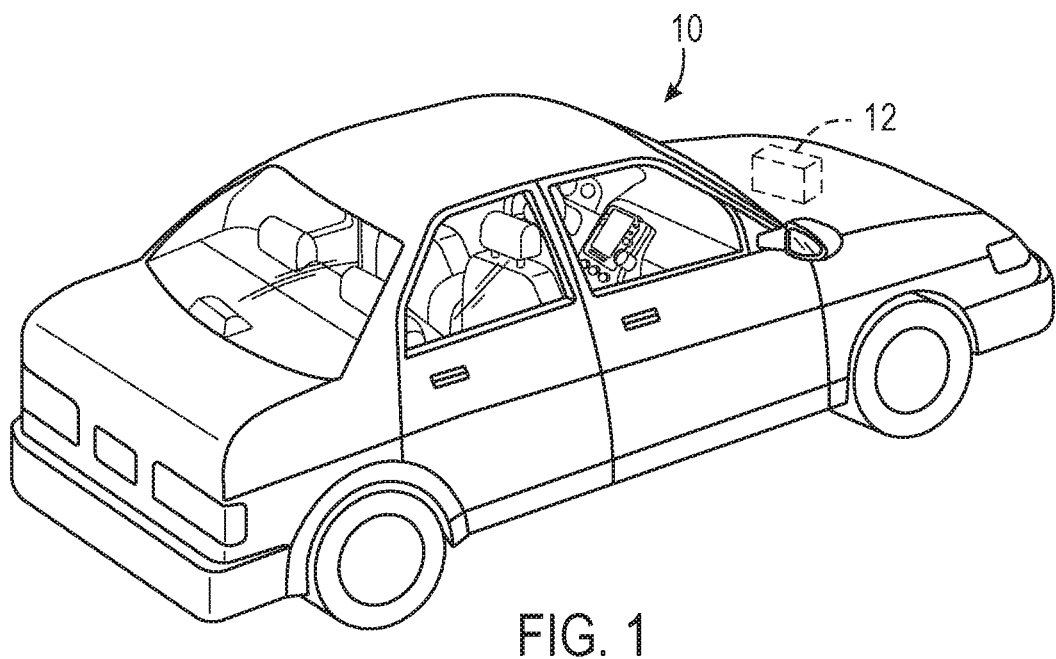
FIG. 1 is a schematic view of an embodiment of an xEV, in accordance with an embodiment of the present approach.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
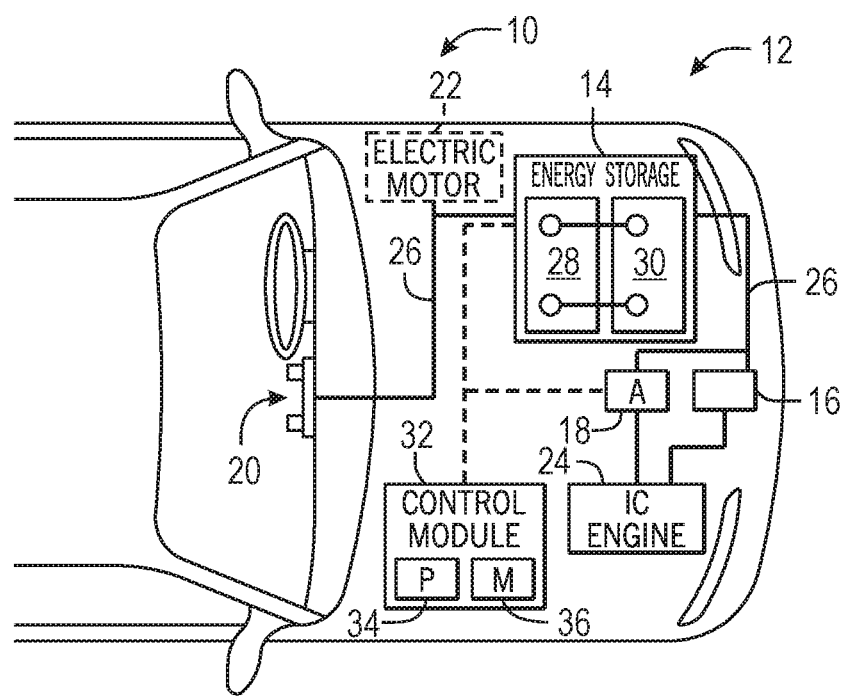
FIG. 2 is a partial schematic view of the xEV of FIG. 1, illustrating power distribution throughout the xEV, in accordance with an embodiment of the present approach.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 20 and the ignition system 16, which may be used to start (e.g., crank) the internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running. More specifically, the alternator 18 may convert the mechanical energy produced by the rotation of the internal combustion engine 24 into electrical energy. Additionally or alternatively, when the vehicle 10 includes an electric motor 22, the electric motor 22 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 22 during regenerative braking. As such, the alternator 18 and/or the electric motor 22 are generally referred to herein as a regenerative braking system.

To facilitate capturing and supplying electric energy, the energy storage component 14 may be electrically coupled to the vehicle's electric system via a system bus 26. For example, the bus 26 may enable the energy storage component 14 to receive electrical energy generated by the alternator 18 and/or the electric motor 22. Additionally, the bus 26 may enable the energy storage component 14 to output electrical energy to the ignition system 16 and/or the vehicle console 20. Accordingly, when a 12 volt battery system 12 is used, the bus 26 may carry electrical power typically between 8-18 volts.

Additionally, as depicted, the energy storage component 14 may include multiple battery modules. For example, in the depicted embodiment, the energy storage component 14 includes a lithium ion (e.g., a first) battery module 28 and a lead-acid (e.g., a second) battery module 30, which each of which may include one or more battery cells. In other embodiments, the energy storage component 14 may include any number of battery modules. Additionally, although the lithium ion battery module 28 and lead-acid battery module 30 are depicted adjacent to one another, they may be positioned in different areas around the vehicle. For example, the lead-acid battery module may be positioned in or about the interior of the vehicle 10 while the lithium ion battery module 28 may be positioned under the hood of the vehicle 10.

In some embodiments, the energy storage component 14 may include multiple battery modules to utilize multiple different battery chemistries. For example, when the lithium ion battery module 28 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 32. More specifically, the control module 32 may control operations of components in the battery system 12, such as relays (e.g., switches) within energy storage component 14, the alternator 18, and/or the electric motor 22. For example, the control module 32 may regulate amount of electrical energy captured/supplied by each battery module 28 or 30, perform load balancing between the battery modules 28 and 30, determine a state of charge of each battery module 28 or 30, sense operation parameters such as the voltage and temperature of each battery module 28 or 30, control voltage output by the alternator 18 and/or the electric motor 22, and the like. Although the control module 32 is illustrated in FIG. 2 as being separate from the energy storage component 14, it may be integrated into the energy storage component 14 or integrated into one or more battery modules 28 and 30.

The control unit 32 may include one or more processors 34 and one or more memories 36. More specifically, the processor 34 may include one or more application specific integrated circuits (ASICs), one or more field programmable gate arrays (FPGAs), one or more general purpose processors, or any combination thereof, under software or firmware control as appropriate. Additionally, the memory 36 may include volatile memory, such as random access memory (RAM), and/or non-volatile memory, such as read-only memory (ROM), optical drives, hard disc drives, or solid-state drives. In some embodiments, the control unit 32 may include portions of a vehicle control unit (VCU) and/or a separate battery control module.

While the battery modules in the energy storage component 14 may be connected in any suitable arrangement, for the purposes of the examples discussed herein, the lithium ion battery module 28 and the lead-acid battery module 30 are connected in parallel across their terminals. In other words, the lithium ion battery module 28 and the lead-acid module 30 may be coupled in parallel to the vehicle's electrical system via the bus 26. Furthermore, as discussed in detail below, one or more of the battery modules in the energy storage component 14 may include a relay that may perform various functions, such as selectively coupling and decoupling the battery module from the system bus 26.

Figure 3:
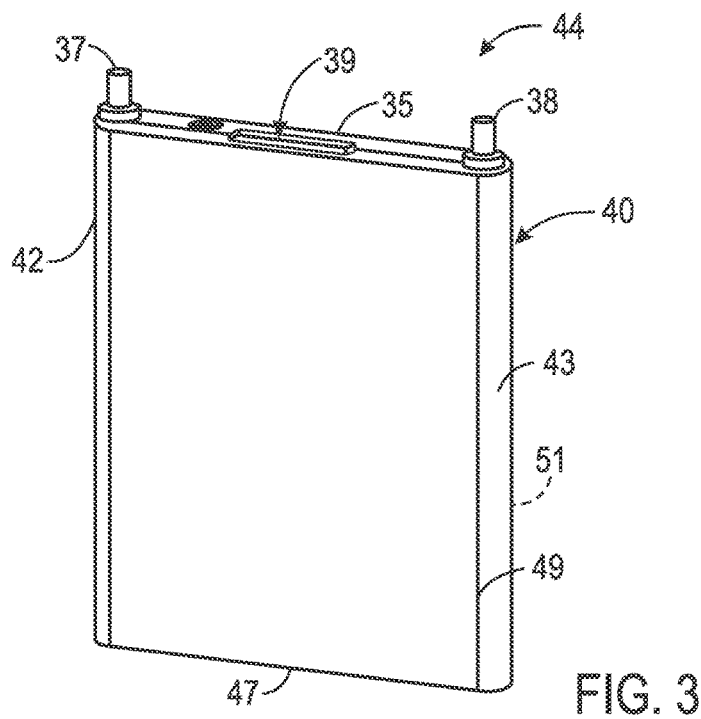
FIG. 3 is a perspective view of a prismatic battery cell that may be used in the battery module of FIG. 2.

Turning briefly to FIG. 3, the battery modules 28 and 30 may contain any suitable type of battery cell or cells as deemed appropriate for the particular application. Further, if a lithium ion battery module 28 is used, it may include any appropriate type of battery cells, such as cylindrical, prismatic or pouch cells. To the extent that prismatic cells are used, each of the prismatic cells may be similar to the battery cell 44 illustrated in FIG. 3. As defined herein, a prismatic battery cell 44 may include a prismatic case that is generally rectangular in shape. In contrast to pouch cells, the prismatic casing is formed from a relatively inflexible, hard (e.g., metallic or plastic) material. In accordance with present embodiments, each prismatic battery cell may include a top casing portion 35, where a set of cell terminals 37 and 38 (e.g., positive and negative cell terminals) may be located, although such terminals may be located elsewhere depending upon the design of a particular prismatic cell. One or more cell vents 39 may also be located on the top casing portion 35 or other suitable location. The prismatic cell casing 40 also includes a bottom casing portion 41 positioned opposite the top casing portion 35. First and second sides 42 and 43, which may be straight or rounded, may extend between the bottom and top casing portions 41 and 35 in respective positions corresponding to the cell terminals 37 and 38. First and second faces 49 and 51, which may be flat (as shown) or rounded, may couple the first and second sides 42 and 43 at opposing ends of each battery cell 44.

As stated above, present embodiments of the lithium ion battery module 28 may include one or more electrical connection points within the lithium ion battery module 28 for sensing. In particular, one or more of the electrical connection points may be located on or within a battery module relay system in the lithium ion battery module 28 (e.g., using a connector associated with the relay). These and other approaches in accordance with the present disclosure may be further appreciated with reference to FIGS. 4 and 5, which depict relay connection architectures that may be associated with the lithium ion battery module 28. Although the present embodiments are described with respect to a mechanical relay, it should be appreciated that the lithium ion battery module 28 may employ any suitable power switching device, such as an insulating gate bipolar transistor (IGBT), power MOSFET, thyristor, etc.

Regarding its architecture, the relay 48 includes a switch control, such as a coil 50 that can be energized and deenergized to cause a switch 54 to move between an open and closed position to connect or disconnect, respectively, the battery cells 44 on one side 52 of the switch 54 to the system bus 26 on the other side 56 of the switch 54. For example, the relay 48 may be configured such that the relay 48 connects or disconnects the battery cells 44 to a positive or negative terminal of the energy storage component 14. Alternately, the relay 48 may be disposed within the group of battery cells 44 such that the relay 48 is configured to control the amount of voltage or current produced by the battery cells 44 as a whole (e.g., by connecting or disconnecting battery cells 44 in series or in parallel to produce the desired voltage or current). The relay 48 may be a monostable or a bi-stable relay or, more generally, may be any type of relay suitable for use in accordance with the present approaches. The relay 48 may be driven by a relay driver 58, which may be one of several electronic devices within the control module 32. The relay driver 58 sends signals on relay control lines 65 to the coil 50, and the relay control lines 65 may be coupled to the relay 48 via a connector 67.

As mentioned above, the control module 32 may monitor and control some or all of the components of the lithium ion battery module 28. In particular, the control module 32 may be configured to control the lithium ion battery module 28 or other components of the vehicle 10 based on the voltage produced by the lithium ion battery module 28. To enable measurement of the voltage produced by the lithium ion battery module 28, the control module 32 may include measurement electronics 62, such as sensors and voltage and/or temperature detection circuitry. The measurement electronics 62 may be connected to one or more sense connection points 64 (shown as 64A-64D) within the lithium ion battery module 28 by respective sensing conductors 66 (shown as 66A-66D). The sense connection points 64, as described herein, may be considered to include locations within the lithium ion battery module 28 to which the measurement electronics 62 are electrically connected to sense parameters that facilitate control of the lithium ion battery module 28. For example, the sense connection points 64A and 64B provide an indication of the voltage across the battery cells 44, and the sense connection points 64C and 64D provide an indication of the voltage on the system bus 26.

Figure 4:
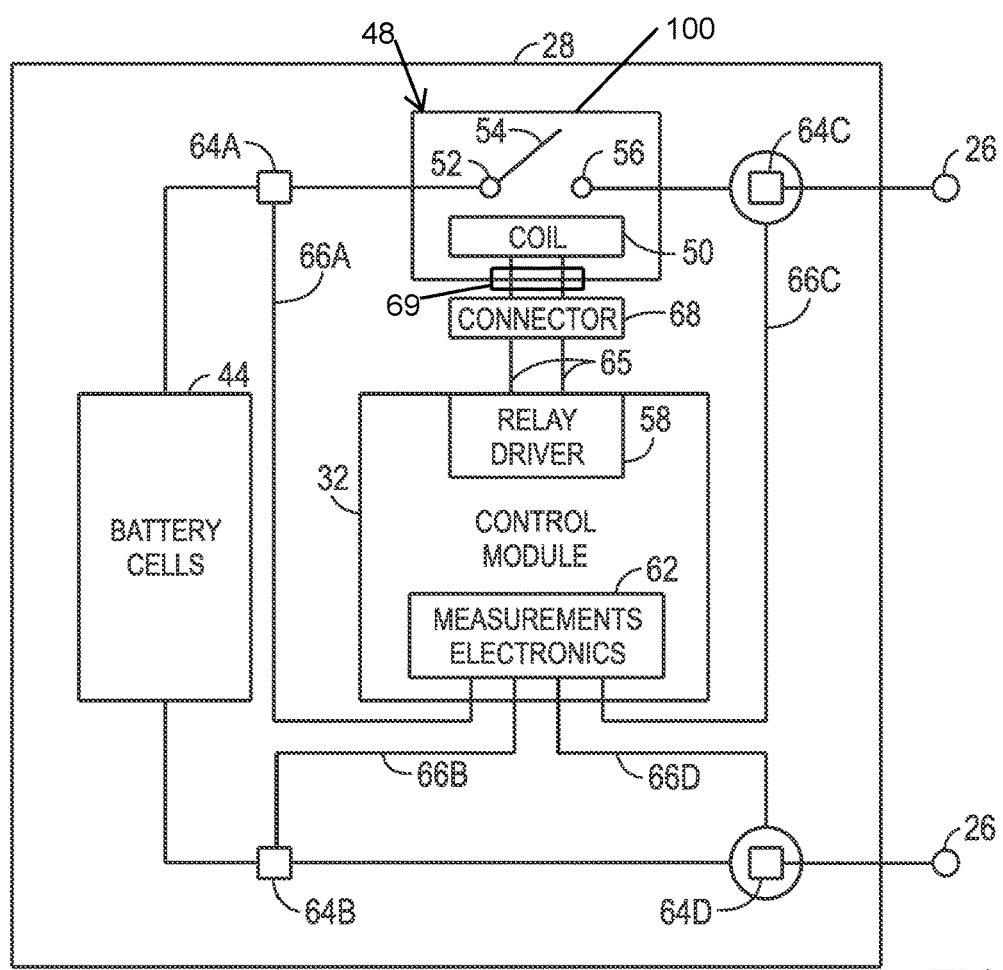
FIG. 4 is a schematic representation of an electrical interconnection scheme having sense connection points external to a relay used in the battery module of FIG. 2.

As shown in FIG. 4 and FIG. 6, the sense connection points 64A and 64C are disposed outside of the housing 100 of the relay 46 (see FIG. 4 and FIG. 6) such that the sensing conductors 66A and 66C are routed around other components. Further, devices and methods of securing connections such as ring terminals, fasteners, and welding may be used to create the connections between the sensing conductors 66A and 66C and the sense connection points 64A and 64C.

Figure 5:
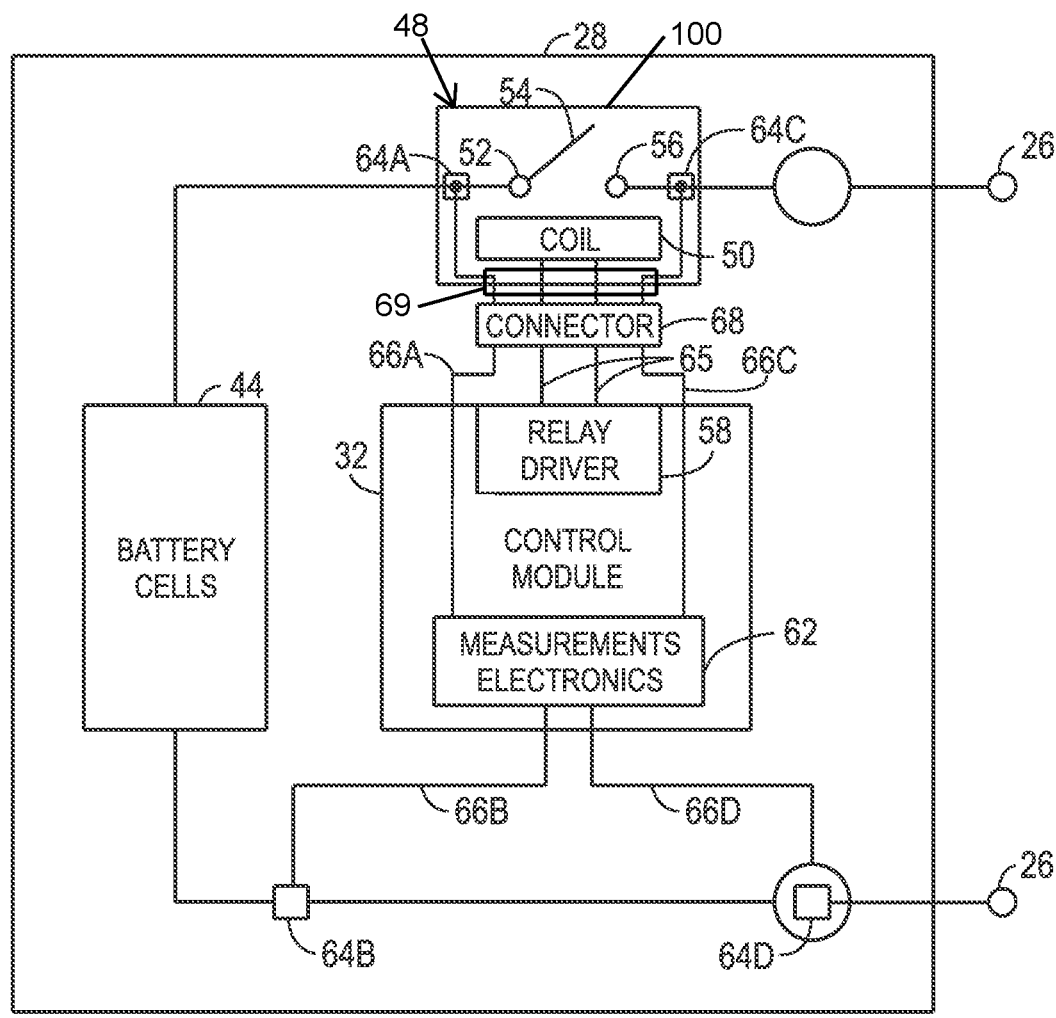
FIG. 5 is a schematic representation of an electrical interconnection scheme having sense connection points internal to a relay used in the battery module of FIG. 2, in accordance with an embodiment of the present approach.

To reduce the complexity of manufacturing and assembling the connections between the measurement electronics 62 and the sense connection points 64A and 64C, the lithium ion battery module 28 may include one or more sense connection points 64A and 64C located within the housing 100 of the relay 48 (see FIG. 5 and FIG. 7). For instance, referring to FIG. 5, the sense connection points 64A and 64C may be located at each side 52 and 56, respectively, of die switch 54, and these connection points 64A and 64C may have conductors internal to the relay 48 that link the sense connection points 64A and 64C to a terminal 69 so that they can make contact with external sensing conductors 66A and 66C. As clearly shown by comparing FIGS. 4 and 5, using the sense connection points 64A and 64C internal to the relay 48 may reduce the complexity of the connections and routing associated with the measurement electronics 62, sensing conductors 66, and the various battery connection points 64. For example, as illustrated in FIG. 5 and FIG. 7, the sensing conductors 66A and 66C between the sense connection points 64A and 64C and the measurement electronics 62 may be routed in a similar manner to the connections between the relay control lines 65 and the relay 48 rather than separately. Further, the sensing conductors 66A and 66C may be integrated into the same connector 68 with the relay control lines 65. Because a common connector 68 is used for both the relay control lines 65 and the sensing conductors 66A and 66C, the external connections between the outputs of the relay 48 and the sensing conductors 66A and 66C may be eliminated, as illustrated in FIG. 7.

In addition to sensing, the sense connection points 64 may be used to provide power to the control module 32 without a separate connection (i.e., via the sense connection points 64A and 64C and the sensing conductors 66A and 66C). As shown in FIG. 5, the battery cells 44 may, for example, provide power to the control module 32 via the sense connection points 64A and 64B. In particular, the battery cells 44 may apply power at the sense connection points 64A and 64B, which is then provided to the control module 32 by the sensing conductors 66A and 66B, respectively. That is, in addition to providing sensing data to the measurement electronics 62, the sensing conductors 66 may also provide power to the control module 32. Similarly, the lead-acid battery module 30, which is coupled to the system bus 26 in parallel to the lithium ion battery module 28, may provide power to the control module 32 via the sense connection points 64C and 64D and the sensing conductors 66C and 66D. Further, in these embodiments, the control module 32 may configure either the battery cells 44 or the lead-acid battery module 30 to power the control module 32 based on various parameters of the battery cells 44 and the lead-acid battery module 30, such as state of charge, temperature, etc. Using the battery cells 44 or the lead-acid battery module 30 to power the control module 32 via the sense connection points 64 and the sensing conductors 66 may further simplify the wiring scheme of the lithium ion battery module 28 and may also increase the reliability and redundancy of the power source for the control module 32.

One or more of the disclosed embodiments, alone or in combination, may provide one or more technical effects useful for monitoring the voltage produced by a battery module. For example, certain embodiments may reduce the complexity of connecting measurement electronics to various locations within the battery module for sensing. For example, the present sense connection points result in connections to the measurement electronics that may be routed in similar manner to connections between the relay coil and a relay driver. Indeed, both types of connections may be made using an integrated connector. The technical effects and technical problems in the specification are exemplary and are not limiting. It should be noted that the embodiments described in the specification may have other technical effects and can solve other technical problems.

While only certain features and embodiments of the invention have been illustrated and described, many modifications and changes may occur to those skilled in the art (e.g., variations in sizes, dimensions, structures, shapes and proportions of the various elements, values of parameters (e.g., temperature, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A relay for use with a battery module including
a battery module housing,
a plurality of battery cells disposed in the battery module housing,
a battery terminal configured to output power produced by the plurality of battery cells,
a control module having measurement electronics configured to sense a condition of the plurality of battery cells via a set of sensing lines and having a relay driver configured to deliver signals to the switch control via a set of relay control lines, and
a connector configured to couple the set of relay control lines and the set of sensing lines to the relay, the relay for electrically coupling and decoupling the plurality of battery cells to the battery terminal, the relay comprising:
a relay housing distinct from the battery module housing;
a first contact configured to be electrically coupled to a first portion of the battery module and a second contact configured to be electrically coupled to a second portion of the battery module, wherein the first and second contacts are external to the relay housing;
a switch disposed within the relay housing and interposed between the first contact and the second contact;
a switch control disposed within the relay housing and operable to cause the switch to transition between an open state and a closed state;
a first sense connection point located in the relay housing on one side of the switch and a second sense connection point located in the relay housing on the other side of the switch; and
a terminal having a first set of conductors extending to the switch control and a second set of conductors extending to the first and second sense connection points respectively, wherein the terminal is configured to be coupled to the connector such that the first set of conductors make electrical contact with the set of relay control lines and the second set of conductors make electrical contact with the set of sensing lines.

2. The relay of claim 1, wherein the switch comprises a mono-stable switch.

3. The relay of claim 1, wherein the switch comprises a mechanical switch.

4. The relay of claim 1, wherein the switch control comprises a coil.

5. The relay of claim 1, wherein the connector of the battery module comprises:
terminating ends of the set of relay control lines disposed in a connector housing; and
terminating ends of the set of sensing lines disposed in the connector housing.

6. The relay of claim 5, wherein the terminating ends of the set of relay control lines are configured to make electrical contact with the first set of conductors at the terminal of the relay.

7. The relay of claim 6, wherein the terminating ends of the set of sensing lines are configured to make electrical contact with the second set of conductors at the terminal of the relay.

\* \* \* \* \*